United States Patent [19]

Wischermann

[11] 4,413,273
[45] Nov. 1, 1983

[54] SYSTEM FOR MIXING TWO COLOR TELEVISION SIGNALS

[75] Inventor: Gerhard Wischermann, Darmstadt, Fed. Rep. of Germany

[73] Assignee: Robert Bosch GmbH, Stuttgart, Fed. Rep. of Germany

[21] Appl. No.: 307,381

[22] Filed: Oct. 1, 1981

[30] Foreign Application Priority Data

Oct. 7, 1980 [DE] Fed. Rep. of Germany ....... 3037779

[51] Int. Cl.³ .......................................... H04N 9/535
[52] U.S. Cl. .................................................. 358/22
[58] Field of Search .......................... 358/22, 182, 183

[56] References Cited

U.S. PATENT DOCUMENTS

| 3,959,813 | 5/1976 | Legler | 358/22 |
| 4,041,527 | 8/1977 | Rayner | 358/22 |
| 4,319,266 | 3/1982 | Bannister | 358/22 |
| 4,329,710 | 5/1982 | Taylor | 358/22 |

Primary Examiner—Michael A. Masinick
Attorney, Agent, or Firm—Frishauf, Holtz, Goodman & Woodward

[57] ABSTRACT

The specification describes a system for mixing and (chroma keying) two color television signals as a function of the color of one of the color signals, or of a third color television signal. The system comprises an automatic color generator by means of which the color present in a foreground signal at a selectable position on the corresponding television picture is used as a reference for the switching operation. The adjustment of the keying color is thereby considerably simplified.

8 Claims, 2 Drawing Figures

SYSTEM FOR MIXING TWO COLOR TELEVISION SIGNALS

BACKGROUND TO THE INVENTION

This invention relates to a system for mixing two colour television signals.

In order to mix two colour television signals according to the chroma keying process, it is known to derive from one of these two colour television signals, or from a third television signal, a switching signal when this represents an adjustable colour. Usually the colour blue is chosen for this purpose, because this colour can usually be avoided in the configuration of a foreground (for example a speaker and his clothing) so that, with the aid of a blue wall arranged behind the speaker, a cross-fading into any background is easily possible. However other colours may also be used for chroma keying. In the known technique described in German patent DE-PS No. 23 61 269, to which U.S. Pat. No. 3,959,813, LEGLER, assigned to the assignee of this application, corresponds, the keying colour is selected manually with the aid of a suitable operating element which is continuously adjusted until the desired result appears in the output colour television signal and thus becomes visible on a monitor. Under certain circumstances, this process can be quite time-consuming. The object of the invention is therefore to attain a much simpler selection of the keying colour.

SUMMARY OF THE INVENTION

Accordingly, the present invention provides a system for mixing two colour television signals in dependence upon the colour of one of the two colour television signals or of a third colour television signal (hereinafter referred to as the foreground signal), the system comprising a mixing or switching circuit for the two colour television signals, a switching signal generator controlling the operation of the mixing circuit and arranged to compare the foreground signal with a reference signal, and means for deriving the said reference signal from the foreground signal by sampling the latter at a point corresponding to a selected position on an image of the foreground signal and storing the sampled value.

The system according to the invention has the advantage that the keying colour can be readily and quickly selected with the aid of a monitor image.

BRIEF DESCRIPTION OF THE DRAWINGS

An embodiment of the invention will now be described, by way of example, with reference to the accompanying drawings, wherein.

DESCRIPTION OF THE PREFERRED EMBODIMENT

The following embodiment of the invention assumes that the invention is performed in a digital colour television system, because with digital colour television signals the present invention can be implemented very easily. This does not mean, however, that the invention is not suitable for mixing analogue colour television signals.

Figure 1:
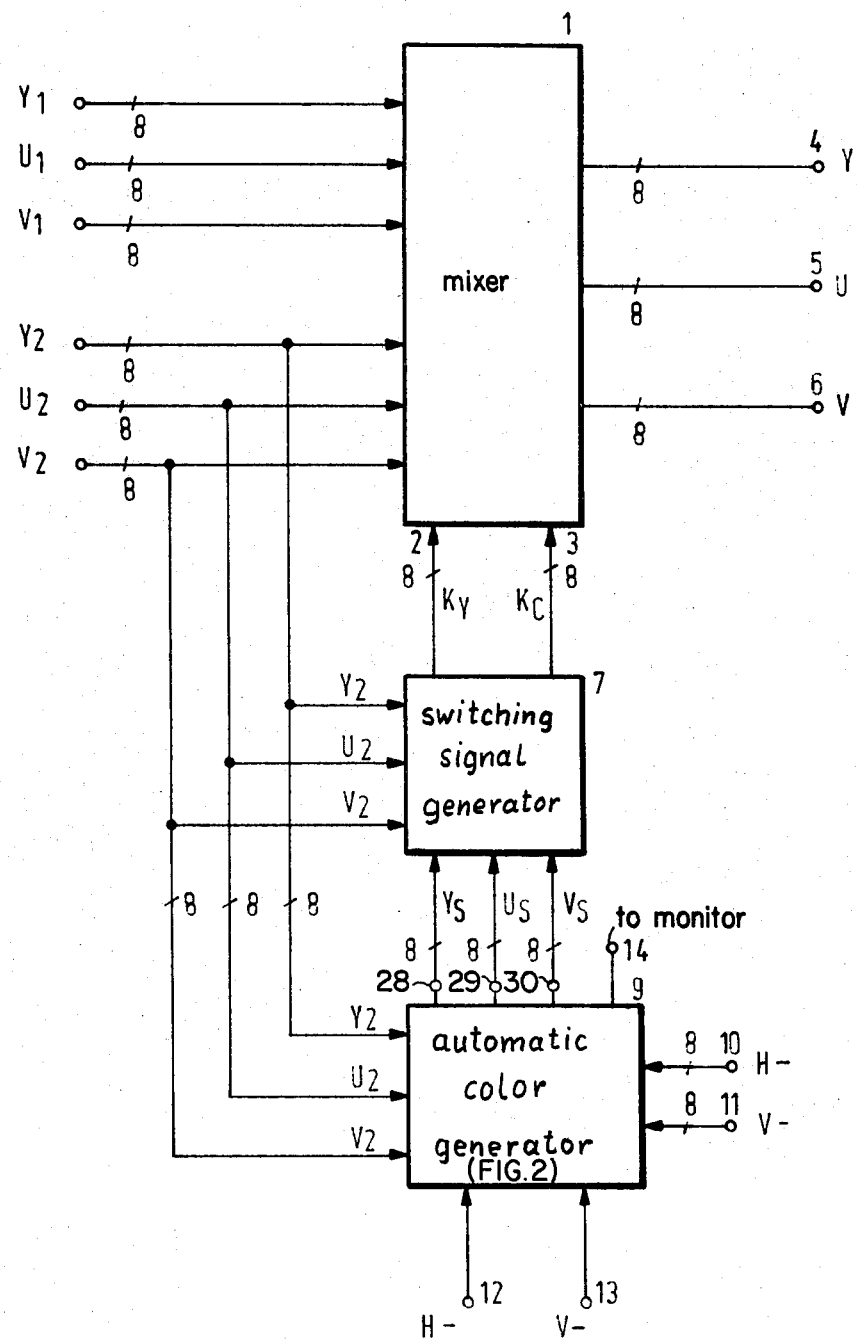
FIG. 1 is a block circuit diagram for mixing two colour television signals according to an embodiment of the invention.

FIG. 1 schematically illustrates a digital colour television signal mixing system for chroma keying. For this purpose, to the inputs of a digital mixing or dissolving circuit 1 there are delivered on the one hand the luminance and colour difference components Y1, U1 and V1 of a background colour television signal, and on the other hand the corresponding components Y2, U2 and V2 of a foreground colour television signal. The signals are preferably digitally coded in an 8-bit format. As a function of switching signals $K_y$ and $K_c$ delivered at 2 and 3 from a switching signal generator 7, the digital fader 1 passes on the background signal, or the foreground signal, or any linear combination thereof, to the output 4, 5 and 6. Y, U and V designate the luminance and colour difference components of the digital output signal. Instead of the digital mixer 1, simple change-over switches could alternatively be used. It has been found however that when an abrupt change-over between two digital signals takes place disturbances may occur due to non-observance of the scanning theorem, so that mixing, by fading-in, is preferable.

In the switching signal generator 7, which may operate generally according to the principles described for example in our copending U.S. patent application Ser. No. 279,746, filed July 2, 1981, HEITMANN, now U.S. Pat. No. 4,365,308, of Dec. 21, 1982, assigned to the assignee of this application, the switching signals $K_y$ and $K_c$ are derived from the components Y2, U2 and V2 of the foreground signal. For this purpose, in the switching signal generator 7 the components of the foreground signal are compared with a reference signal having components $Y_s$, $U_s$ and $V_s$, representing the keying colour. Digital mixers and switching signal generators are well known in the television art and therefore the remainder of this specification will concentrate on the selection of the reference keying colour with which the present invention is primarily concerned.

In contrast to the known method, the signals $Y_s$, $U_s$ and $V_s$ are not directly adjusted manually but are produced in an apparatus 9 designated in FIG. 1 as an automatic colour generator. For this purpose the automatic colour generator 9 is provided with the components Y2, U2 and V2 of the foreground signal. Moreover, information concerning the horizontal (H) and vertical (V) positions of a desired image point of the foreground signal is supplied to the generator 9 via the inputs 10 and 11 respectively. The automatic colour generator 9 is also supplied with H and V frequency pulses via the inputs 12 and 13 respectively. Finally the automatic colour generator 9 has an output 14 at which there appears a marker pulse.

Figure 2:
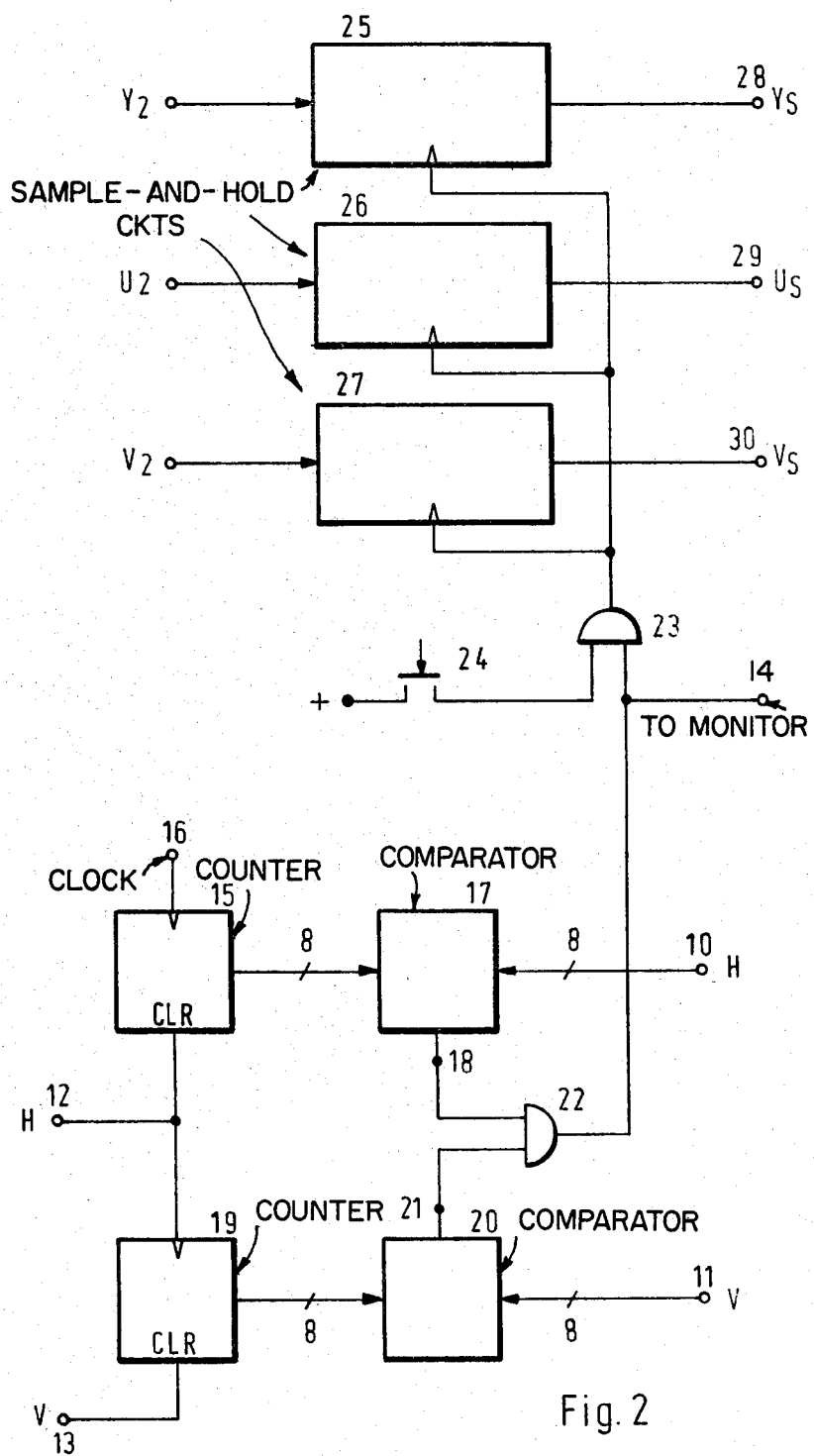
FIG. 2 is a block circuit diagram of the apparatus for selecting the keying colour.

FIG. 2 is a more detailed block diagram of the automatic colour generator 9 of FIG. 1. A first counter 15 is provided, via its counting input 16, with a clock signal whose frequency is substantially greater than the horizontal frequency of the colour television signals, the counter 15 being reset or cleared by the H pulses delivered at terminal 12 and applied to the "clear" input CLR. The count value currently available at the output of the counter thus represents the position of the current image point of the foreground signal in the horizontal direction. This value is compared in a comparator 17 with the adjustable reference value delivered at 10. Upon coincidence, the comparator 17 delivers an output signal at output 18. In similar manner, a second counter 19 is clocked by H frequency pulses and is reset or cleared by means of the V pulses delivered to input CLR from terminal 13. The count value currently available at the output of this counter 19 thus represents the position of the current image point of the foreground signal in the vertical direction; i.e. the particular line in the television signal. This value is compared in a comparator 20 with the adjustable reference value delivered at 11. Upon coincidence the comparator 20 delivers an output signal at 21. When both the horizontal and vertical positions coincide, a signal is passed on from a first AND circuit 22 to one input of a further AND circuit 23. At the same time, this signal is delivered via the output 14, together with the foreground signal, to a monitor (not shown) and serves as a visible marker superimposed on the foreground image displayed by the monitor. The reference values delivered at inputs 10 and 11 of the apparatus of FIG. 2 are adjustable by means of suitable manual operating elements (not shown) so that the marker on the monitor is freely movable in both horizontal and vertical directions on the picture screen. In order to select or adjust the keying colour desired, the marker is brought to that position on the picture screen which has the desired keying colour desired. By actuating a key 24 the output pulse of the AND circuit 22 is passed on via the AND circuit 23 to the sampling inputs of a sample-and-hold circuit 25, 26 and 27. This ensures that the value of the foreground signal comprising the components Y2, U2 and V2 which corresponds to the image position selected by the marker is stored until the application of a subsequent sampling pulse to the circuits 25, 26 and 27 from the AND gate 23. At the outputs 28, 29 and 30 the signals $Y_S$, $U_S$ and $V_S$, which represent the keying colour selected from the monitor image, are available for passing on as a reference to the switching signal generator 7 (FIG. 1).

In the embodiment shown by way of example, the procedure adopted was, that one of the two signals to be mixed was made use of for generating the switching signals (self-mixing). However, it is equally possible to produce the switching signals by using a third signal regarded as the foreground signal.

I claim:

1. A system for mixing two colour television signals in dependence upon the colour of one of at least two colour television signals
   wherein said one signal is designated a foreground signal comprising
   a mixing circuit (1) for the at least two colour television signals,
   a switching signal generator (7) connected to and controlling the operation of the mixing circuit,
   wherein the foreground signal is compared with a reference signal,
   and further comprising
   means (9; FIG. 2) for deriving the said reference signal from the foreground signal including means (15, 17; 19, 20) for sampling the foreground signal at a point corresponding to a selected position on an image of the foreground signal
   means for storing the sampled value; and
   means (28, 29, 30) for controlling the switching signal generator by the sampled, stored values.

2. A system as claimed in claim 1, wherein the means for deriving the said reference signal comprises
   means (15, 17, H; 19, 20, 22, 14) for generating a visible marker which is adjustable in position on the screen of a monitor which also displays the foreground image, and means (24; 25, 26, 27) including the storing means for sampling and storing the value of the foreground signal at a point corresponding to the point in the foreground image coincident with the marker.

3. A system as claimed in claim 2, wherein the means for generating the adjustable marker comprises
   a first counter (15) counting clock signals having a frequency substantially greater than the horizontal (H) frequency of the colour television signals, the first counter being reset by H frequency signals;
   a first comparator connected to compare the current count value of the first counter with a first adjustable reference value (10, H) and to provide an output signal when these coincide;
   a second counter (19) counting clock signals having a frequency substantially greater than the vertical (V) frequency of the colour television signals, the second counter being reset by V frequency signals,
   a second comparator (20) connected to compare the current count value of the second counter with a second adjustable reference value (11, V) and to provide an output signal when these coincide; and
   an AND gate (22) whose inputs are connected to the outputs of the first and second comparators (17, 20), the output signal of the AND gate being displayed on the monitor screen as the adjustable marker.

4. A system as claimed in claim 3, wherein the means for sampling and storing the value of the foreground signal at the said point comprises manually-operable (24) gating means (23) for supplying the output signal of the AND gate; and a sample-and-hold system (25, 26, 27) for sampling the foreground signal and forming said storage means.

5. A system according to claim 3, wherein the clock signals counted by the second counter (19) are H frequency signals.

6. A system according to claim 1, wherein the colour television signals and the reference signal are each in the form of a luminance component and two colour difference components.

7. In a television signal mixing system having a mixing circuit (1) for at least two color television signals, and a switching generator (7) connected to and controlling the operation of the mixing circuit,
   a method to mix the at least two color television signals in dependence on one of said color television signals, defined as a foreground signal, comprising the steps of
   sampling the foreground signal at a selected instant of time to derive from said foreground signal a reference signal;
   storing the reference signal;
   and controlling the switching generator as a function of the stored reference signal.

8. Method according to claim 7, wherein said step of sampling the foreground signal at a selected instant of time comprises
   generating a marker pulse at said selected instant of time;
   and controlling the selection of said instant as a function of a displayed foreground signal.

* * * * *